Sept. 5, 1967 L. FELDMEIER 3,339,612
HEATING APPARATUS
Filed Oct. 19, 1965
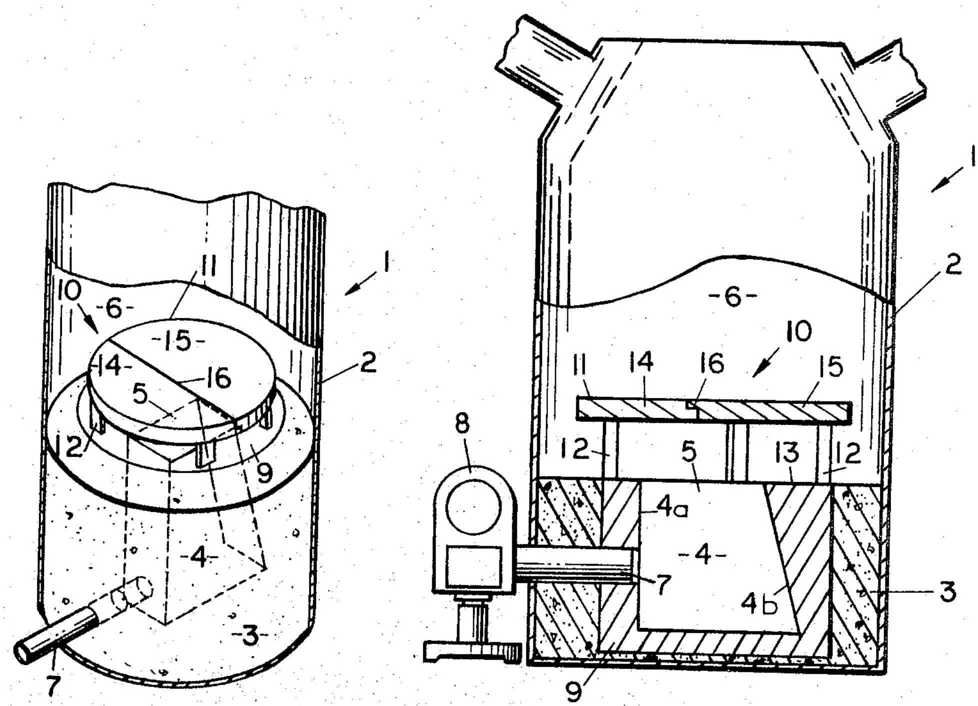
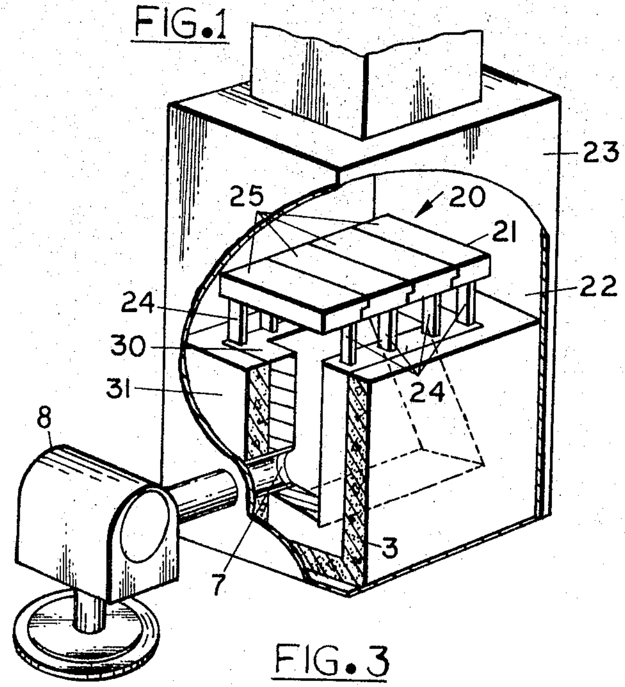
INVENTOR
LUITPOLD FELDMEIER
ATTORNEYS United States Patent Office 3,339,612

Patented Sept. 5, 1967

3,339,612
HEATING APPARATUS

Luitpold Feldmeier, Morriston, Ontario, Canada

Filed Oct. 19, 1965, Ser. No. 498,049
1 Claim. (Cl. 158—1)

This invention relates to improvements in heating apparatus and more particularly to improvements in furnaces of the oil or gas burning types.

It is well known that in such furnaces, particularly the oil-fired hot-air type, thermal efficiency is relatively low due to heat loss from escaping flue gases and also to the absorption of heat by the materials forming the combustion chamber and the heat exchanger. Furthermore, under winter weather conditions, the burner unit operates at very frequent intervals thereby increasing the wear and tear of the unit and utilizing a great deal of electricity to run the motor and the igniter.

It is a primary object of the instant invention, therefore, to provide a refractory device for furnaces which will substantially increase the thermal efficiency of a furnace by absorbing heat from the flue gases for subsequent radiation to the heat exchanger walls.

Another object of the invention is to provide a refractory device which will increase the heating efficiency of the furnace by directing hot gases from the combustion chamber into closer and fuller contact with the heat exchanger walls to insure the fullest possible heat transfer from the gases to the heat exchanger.

Still a further object of the invention is to provide a refractory device which will extend the heating cycle to reduce the frequency of burner operation with a resultant saving in wear and tear of the burner and in electricity.

Yet another object is to provide a refractory device which will keep the temperature of the combustion chamber and heat exchanger at a substantially high level to reduce the amount of heat required to bring these surfaces up to working temperature at the outset of each heating cycle, thereby further increasing the thermal efficiency of the furnace.

I achieve these and other objects and features of the invention by providing a plate or slab of refractory material within the heat exchanger as spaced above the combustion chamber, upon which the hot gases from the combustion chamber impinge to be thereafter deflected to the walls of the heat exchanger prior to passing through the flue to atmosphere.

In drawings which illustrate various embodiments of the invention:

FIGURE 1 is a part cut-away view of the bottom of a furnace showing in perspective the combustion chamber and a refractory device of the present invention mounted on the upper end of the combustion chamber to extend into the heat exchanger, FIGURE 2 is an enlarged, part-sectional side elevation of the furnace of FIGURE 1, and FIGURE 3 is a part-sectional side elevation of a second furnace having a rectangular combustion chamber and heat exchanger to which a second embodiment of a refractory device of the instant invention is fitted.

Referring to FIGURES 1 and 2, a conventional furnace 1 is shown having a cylindrical body 2, the lower portion of which is lined with a sleeve 3 of heat insulating material. In the centre of the sleeve 3 a combustion chamber 4 is located, its open upper end 5 leading into the heat exchanger 6. The nozzle 7 of an oil burner 8, extends radially on a horizontal plane through the body 2, the insulating sleeve 3 and the wall 9 of the combustion chamber 4 to provide a supply of vaporized fuel for combustion in the chamber 4. The inner surface 4_a_ of the front wall of the combustion chamber is preferably perpendicular while the rear wall 4_b_ is preferably inclined centrally from its lower end so that flame injected into the combustion chamber through the nozzle 7 will strike the inclined rear wall 4_b_ and will thus result in heat therefrom being discharged into the heat exchange body of the furnace at a forward angle.

A refractory device 10 comprises a disc-like slab 11 of refractory material, the diameter of which is less than that of the interior of the heat exchanger 6 but greater than the open end 5 of the combustion chamber 4. A plurality of legs 12 of the same material as the slab 11 are adapted to rest on the upper surface 13 of the combustion chamber wall 9 and to support the slab 11 horizontally and substantially concentrically within the heat exchanger 6, but spaced a considerable distance above the combustion chamber to allow heat to pass around the edge of the slab into engagement with the wall of the heat exchanger and into the upper part of the body 2.

In this particular embodiment, the slab 11 is formed in two semi-circular sections 14 and 15 to facilitate its installation within the furnace 1, and their edge-to-edge joint 16 is stepped in order to provide a more rigid and gas-tight joint than a flat edge-to-edge joint. The legs 12 may be integral with the slab 11 or may stand independently, the weight of the slab 11 being sufficient to provide it with stability against the pressure of the hot gases issuing from the combustion chamber 4.

From the above description it will be seen that, upon being installed as shown, the refractory device 10 deflects the hot gases emerging from the open upper end 5 of the combustion chamber 4 and causes them to impinge with some force on the walls of the heat exchanger 6, thereby insuring the maximum amount of heat possible being transferred from the gases to the walls of the heat exchanger. At the same time, the slab 11 is absorbing heat from the gases, and it should be noted that the refractory material forming the slab 11 is one of the "heat-sink" types developed to provide a fast heat absorption rate and a relatively slower heat discharge rate. Thus, at the end of the combustion cycle, the slab 11 continues to radiate heat to the walls of the heat exchanger 6 which, in effect, is equivalent to an extension of the burner operation.

The advantages of this system over the conventional oil burner therefore lie in the additional heat applied to the heat exchanger when the burner is operating, thereby providing a hotter air supply to the area being heated, and a more prolonged heating, thereby reducing the operating time of the burner and saving in fuel and electricity. The device also maintains the interior of the furnace at a high temperature so that heat from the burning fuel is utilized instantly to heat the air rather than the material of the furnace.

Referring now to FIGURE 3, a second embodiment of the invention is shown at 20 in which the heat absorber and deflector 21 of refractory material is of rectangular plan view in order to locate substantially centrally within the heat exchanger 22 of a rectangular furnace 23. In this case, a plurality of legs 24 mounted on the top of the combustion chamber 30 located within the insulating member 31 support the members 21 and the latter is divided into a plurality of rectangular sections 25, the edges of which are joined in step joints similar to that described at 16 in FIGURES 1 and 2. The method of operation and advantages of this modified structure are the same as that described for the device 10.

It should also be noted that while this description has been directed to the installation and operation of the refractory device in an oil-burning hot air furnace, it will, of course, operate equally effectively in other furnaces, such as, for example, gas furnaces and with other heating mediums such as hot water or steam.

Various changes in structural details and arrangement of the several parts may be made without departing from the spirit of the invention. I, therefore, do not wish to be limited to the precise structural details shown and described herein but desire to avail myself of such modifications or changes as come within the scope of the claim appended hereto.

What I claim is:

A furnace comprising an upper part constituting a heat transfer chamber, a combustion chamber below said heat transfer chamber, said combustion chamber having a bottom, a perpendicular front wall and perpendicular side walls and a rear wall opposing said front wall, said rear wall being inclined upwardly from said bottom towards said front wall and spaced therefrom to provide an outlet to said heat transfer chamber, a fuel supply member leading through said front wall of said combustion chamber, a nozzle carried by said fuel supply member directed towards said inclined rear wall, a plurality of refractory legs standing on said combustion chamber walls in circularly spaced relation, and a refractory member supported on a horizontal plane by said legs, said refractory member being of greater diameter than the said outlet from said combustion chamber and having a diameter less than said heat transfer chamber to provide a passage for heat upwardly around said refractory member.

References Cited

UNITED STATES PATENTS

| | | | |
|---|---|---|---|
| 1,725,974 | 8/1929 | Brautigam | 110—97 |
| 2,628,670 | 2/1953 | Mohn | 158—1 |
| 2,791,190 | 5/1957 | Kolb et al. | 110—97 |
| 2,808,046 | 10/1957 | Jaye | 110—97 X |

FREDERICK L. MATTESON, Jr., *Primary Examiner.*

E. G. FAVORS, *Assistant Examiner.*